United States Patent [19]
Wattron et al.

[11] Patent Number: 5,199,249
[45] Date of Patent: Apr. 6, 1993

[54] FARM MACHINE ADAPTABLE TO THE CONTOUR OF THE LAND AND HAVING A PIVOTING HOUSING

[75] Inventors: Bernard Wattron, Haegen; Rino Ermacora, St Jean Saverne, both of France

[73] Assignee: Kuhn, S.A., Saverne Cedex, France

[21] Appl. No.: 790,486

[22] Filed: Nov. 12, 1991

[30] Foreign Application Priority Data

Nov. 12, 1990 [FR] France .................................. 90 14186

[51] Int. Cl.$^5$ .......................................... A01D 34/66
[52] U.S. Cl. ...................................... 56/15.2; 56/15.5; 56/DIG. 14
[58] Field of Search ...................... 56/15.2, 15.5, 15.9, 56/6, 14.9, 15.1, 380, 396, DIG. 14

[56] References Cited

U.S. PATENT DOCUMENTS

| | | | |
|---|---|---|---|
| 3,971,446 | 7/1976 | Nienberg | 172/311 |
| 4,723,396 | 2/1988 | Ermacora | 56/15.2 X |
| 4,858,418 | 8/1989 | von Allwoerden | 56/15.5 |
| 4,979,359 | 12/1990 | Inskeep | 56/15.5 X |
| 4,991,383 | 2/1991 | Ermarcora | 56/15.2 X |
| 5,060,462 | 10/1991 | Helfer et al. | 56/15.5 X |
| 5,076,042 | 12/1991 | Koorn et al. | 56/15.5 X |
| 5,107,663 | 4/1992 | Wattron et al. | 56/DIG. 14 X |

FOREIGN PATENT DOCUMENTS

| | | |
|---|---|---|
| 0073359 | 8/1982 | European Pat. Off. |
| 0163587 | 3/1985 | European Pat. Off. |
| 0297012 | 6/1988 | European Pat. Off. |
| 0277343 | 8/1988 | European Pat. Off. |
| 0356358 | 7/1989 | European Pat. Off. |
| 3444412 | 6/1986 | Fed. Rep. of Germany |
| 3710213 | 1/1988 | Fed. Rep. of Germany |
| 1593947 | 12/1968 | France |
| 2306612 | 7/1976 | France |
| 2608358 | 12/1986 | France |
| 1231659 | 5/1971 | United Kingdom |

*Primary Examiner*—Terry Lee Melius
*Attorney, Agent, or Firm*—Oblon, Spivak, McClelland, Maier & Neustadt

[57] ABSTRACT

A farm machine having a first joint with an upwardly directed axis such that in the vicinity of the first joint, a body is connected to a connecting device with a second joint. The second joint having an axis at least approximately perpendicular to the axis of the first joint and to a longitudinal axis of the body. A universal joint telescopic shaft transmits the rotation movement of an output shaft of a second housing to an input shaft of an intake housing connected to the body.

20 Claims, 4 Drawing Sheets

FARM MACHINE ADAPTABLE TO THE CONTOUR OF THE LAND AND HAVING A PIVOTING HOUSING

BACKGROUND OF THE INVENTION

The present invention relates to a farm machine comprising a connecting means, intended to be connected to the three-point hitch of a motor vehicle, and a body connected to the connecting means with a first joint having an upwardly directed axis. The body comprising at least one work element driven by a movement gear transmission device which comprises a first housing which is rigidly connected to the connecting means and which comprises an input shaft, and a second housing which is connected in rotation with the body and which comprises an output shaft extending in the direction of the body.

A mower of the present invention comprising a cutting mechanism and a hitching structure is known in the related art. The hitching structure is connected at its front part to the three-point hitch of a tractor. The cutting mechanism consists of a beam supporting several drums which each rotate around a vertical axis. At one of its longitudinal ends, the beam is connected to the hitching structure by a pivot joint having a vertical axis which allows a pivoting of the cutting mechanism of about 180° relative to the hitching structure. The cutting mechanism can be pivoted in particular from a first work position which is to the right of the tractor and in which its longitudinal axis extends perpendicularly to the direction of work, up to a second work position which is to the left of the tractor and in which its longitudinal axis also extends perpendicularly to the direction of work. At its other longitudinal end, the beam is equipped with a support by which the cutting mechanism rests on the ground.

The driving in rotation of the drums of the cutting mechanism is performed from the power takeoff of the tractor which drives, by a Cardan shaft, the input shaft of a housing connected to the hitching structure. This input shaft extends in the direction of advance of the tractor and transmits the rotation movement, by a first bevel gear pair, to a first transmission shaft. The latter has its axis of rotation which is merged with the vertical axis connecting the cutting mechanism to the hitching structure, and transmits the rotation movement, by a second bevel gear pair, to a second transmission shaft. The latter extends inside the beam of the cutting mechanism and drives the drums by a bevel gear pair joined to each drum.

Because of such a movement transmission device, the cutting mechanism can be driven in all the positions in which it can be pivoted around the vertical axis connecting it to the hitching structure.

The advantage of this movement gear transmission device is twofold to the extent that not only does it make possible the driving of the cutting mechanism in all its positions, which is very practical and prevents false maneuvers, but it is also a gear transmission, therefore a transmission which is efficient.

However, this mower encounters several difficulties when it has to pass over the obstacles that the terrain can present. Actually, since the cutting mechanism is connected to the hitching structure by a pivot connection with a vertical axis and since the hitching structure is connected to the three-point hitch of the tractor, it is almost impossible for the cutting mechanism to adapt to the contour of the terrain.

As a result, as soon as the cutting mechanism is brought to move in height, the drums run the risk of clogging or striking the obstacles that the terrain can present.

SUMMARY OF THE INVENTION

An object of the present invention is to provide for a novel farm machine that adapts easily to the configuration of the land, while maintaining the double advantage of the transmission device.

For this purpose, the farm machine according to the present invention is characterized by the fact that in the vicinity of the first joint, the body is connected to the connecting means with a second joint having an axis at least approximately perpendicular to the axis of the first joint and to the longitudinal axis of the body, and a universal joint telescopic shaft transmits the rotation movement from the output shaft of the second housing to the input shaft of an intake housing connected to the body.

Since, in the farm machine according to the invention, the body is connected to the connecting means with a second joint having an axis at least approximately perpendicular to the axis of the first joint and to the longitudinal axis of the body, the body can pivot around the axis of the second joint and pass easily over the obstacles that the terrain can present.

Further, the universal joint telescopic shaft, which transmits the rotation movement from the output shaft of the second housing to the input shaft of the intake housing connected to the body, assures the continuity of the driving when the body pivots relative to the connecting means around the axis of the second joint.

According to a further characteristic of the invention, the first joint and the second joint are formed by a cross guided, on the one hand, in a yoke of the connecting means and, on the other hand, in a yoke of the body.

In one embodiment, the axis of the first joint and the axis of the second joint are concurrent.

Further, it is provided that the axis of the first joint and the axis of the second joint extend in the vicinity of the vertical plane of symmetry directed in the direction of advance of the connecting means.

Moreover, the second joint is provided between the first joint and the body. Thus, the body can adapt to the contour of the ground in all the positions in which it can be pivoted around the axis of the first joint.

According to a further characteristic of the invention, the pivoting of the body around the axis of the first joint is performed under the action of a maneuvering means. The latter can be a double rod hydraulic actuator or the equivalent whose double rod is connected at its ends extending beyond the cylinder to the connecting means, and of which the cylinder is in driving connection with the body.

In such a solution, the driving connection between the cylinder and the body can be achieved by a rack connected to the cylinder, which engages with a toothed circular sector connected directly or indirectly in rotation with the body and centered on the axis of the first joint.

Advantageously, the toothed circular sector can be connected in rotation with one of the branches of the cross which forms a part of the first joint.

According to a further characteristic of the invention, the output shaft of the second housing extends at least approximately parallel to the input shaft of the intake housing of the body. As a result, the driving of the input shaft of the body is at least approximately homokinetic.

Further, it is provided that the output shaft of the second housing extends at least approximately at the same level as the input shaft of the intake housing of the body.

According to a further characteristic of the invention, the second housing is connected to the first housing by a cylindrical joint whose swivel pin is merged with the axis of the first joint. The body of the machine can thus be pivoted around the axis of the first joint to be transposed from the transport position into the work position (and vice versa) without this pivoting creating stresses in the movement transmission device.

It is also provided that the input shaft of the first housing drives, by a first bevel gear pair, an intermediate shaft whose axis of rotation is merged with the axis of the first joint, and which drives, by a second bevel gear pair, the output shaft of the second housing.

In a further embodiment of the invention, the second housing can be placed under the first housing.

Moreover, the rotation of the second housing relative to the first housing around its swivel pin can be controlled by an orientation element which is connected directly or indirectly to the body of the farm machine.

Advantageously, the orientation element can connect in rotation the toothed circular sector and the second housing.

According to a further characteristic of the present invention, it is provided that the body comprises a frame which rests on the ground by at least one wheel, and that the working element or elements is or are connected to the frame to be able to move in height relative to the frame.

In a further characteristic of the invention, it is provided that the work element or elements comprises or comprise cutting elements and/or elements for processing the cut product.

Accordingly, the present invention provides for a farm machine comprising a connecting means for connection to a three-point hitch of a motor vehicle; a body connected to the connecting means through a first joint, the first joint having an upwardly directed axis, the body comprising at least one work element which is driven by a transmission means comprising gear means; a first housing rigidly connected to the connecting means, the first housing comprising an input shaft; and a second housing rotatably connected to the body, the second housing comprising an output which extends in a direction of the body.

Additionally, in a vicinity of the first joint, the body is connected to the connecting means through a second joint. The second joint having an axis which is at least approximately perpendicular to the axis of the first joint and to a longitudinal axis of the body. A universal joint telescopic shaft transmits a rotational movement of the output shaft of the second housing to an input shaft of an intake housing connected to the body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
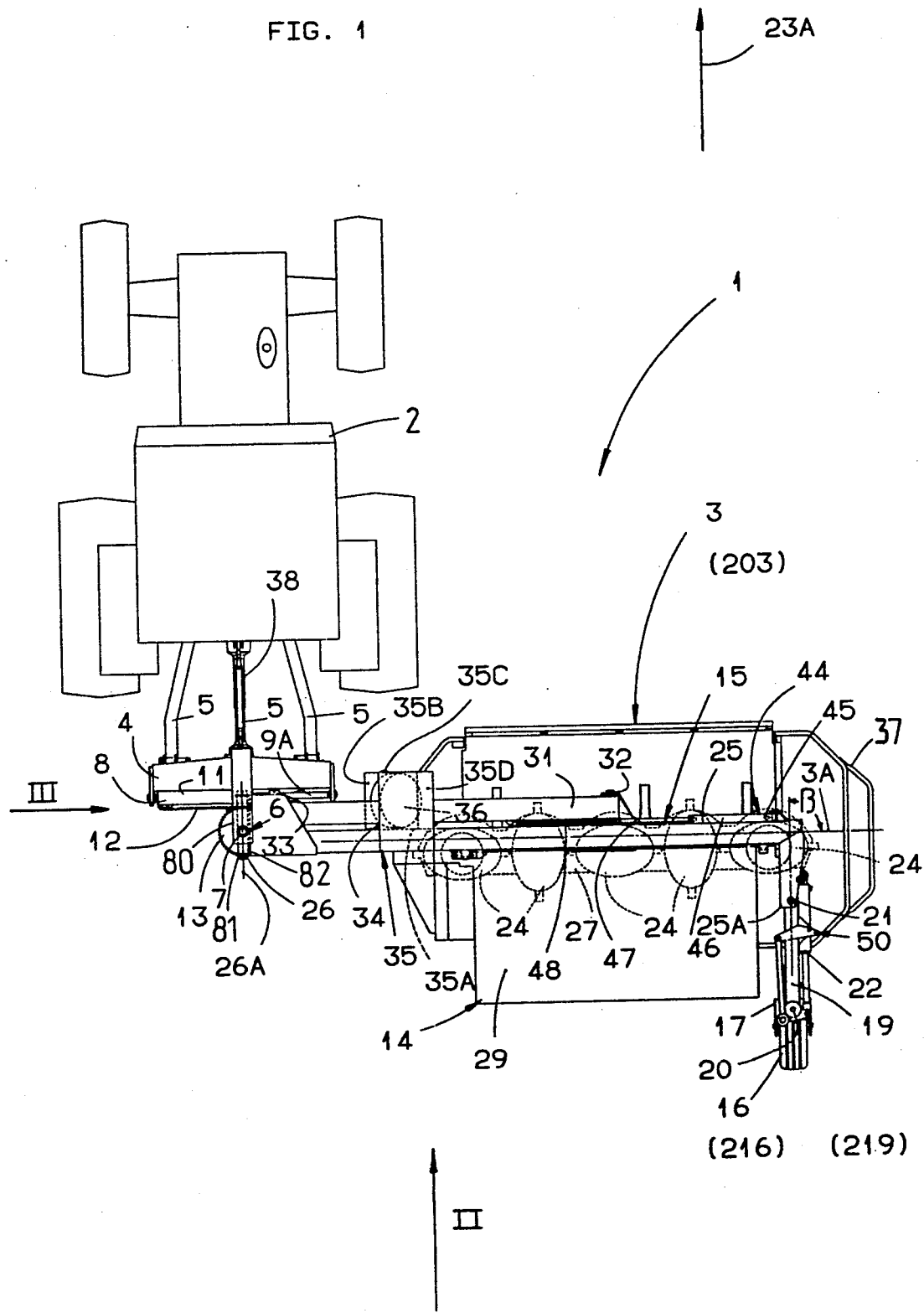
FIG. 1 represents a top view of a harvesting machine according to the invention connected to a farm tractor and placed in a work position.
Figure 2:
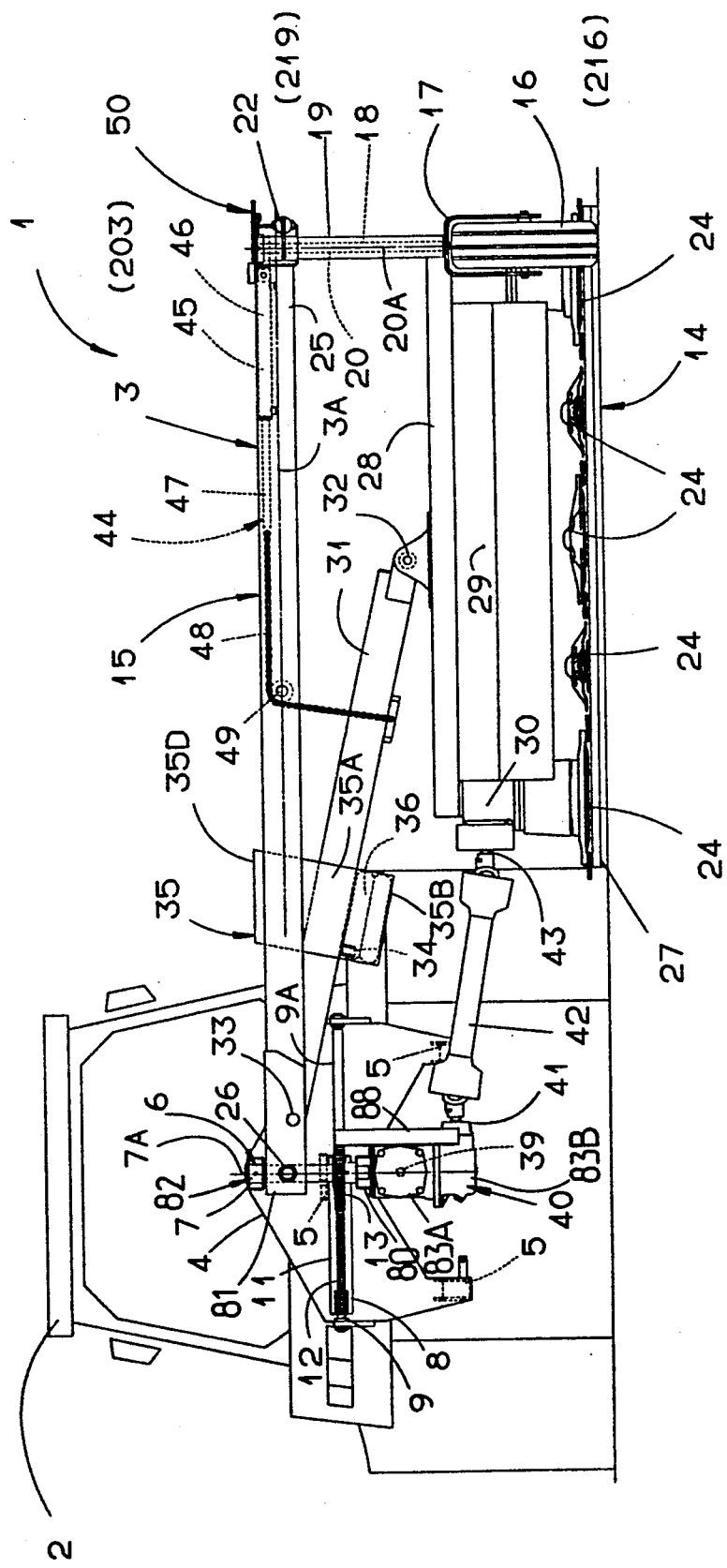
FIG. 2 represents a rear view of the harvesting machine, without protective elements, along arrow II defined in FIG. 1.
Figure 3:
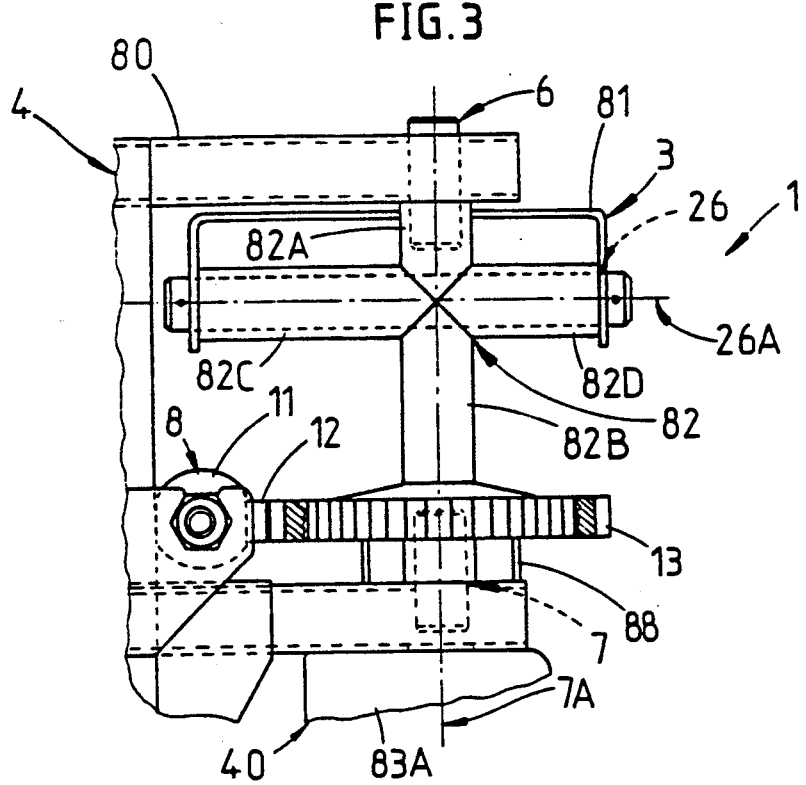
FIG. 3 represents, on an enlarged scale, a view of the first and the second joint along arrow III defined in FIG. 1.

Referring now to the drawings, wherein like reference numerals designate identical or corresponding parts throughout the several views and more particularly to FIGS. 1-3 thereof, in FIGS. 1 to 3, a mower (1) according to the invention is shown. The mower is hitched to a farm tractor (2).

Mower (1) comprises a body (3) and a hitching structure (4). Hitching structure (4) is intended to be connected, at its front part, to a three-point hitch (5) of the farm tractor (2). Body (3) is connected to hitching structure (4) by a connecting device (6). In this embodiment according to the invention, connecting device (6) comprises a cross (82) which is guided, on the one hand, in a first yoke (80) of hitching structure (4) and, on the other hand, in a second yoke (81) of body (3). The first yoke (80) is connected more precisely to two at least approximately vertical branches (82A, 82B) of cross (82) to constitute a first joint (7) with geometric axis (7A) that is at least approximately vertical. Second yoke (81) is connected to two at least approximately horizontal branches (82C, 82D) of cross (82) to constitute a second joint (26) with geometric axis (26A) that is at least approximately horizontal and at least approximately perpendicular to longitudinal axis (3A) of body (3). Such an arrangement makes it possible, on the one hand, for body (3) to adapt to the contour of the land by pivoting body (3) around horizontal axis (26A) of connecting device (6) and, on the other hand, allows a modification of the angular position of body (3) relative to hitching structure (4) by pivoting body (3) around vertical axis (7A) of connecting device (6). Moreover, vertical axis (7A) and horizontal axis (26A) of connecting device (6) are concurrent and extend in the vicinity of the vertical plane of symmetry directed in the direction of advance of hitching structure (4).

Figure 5:
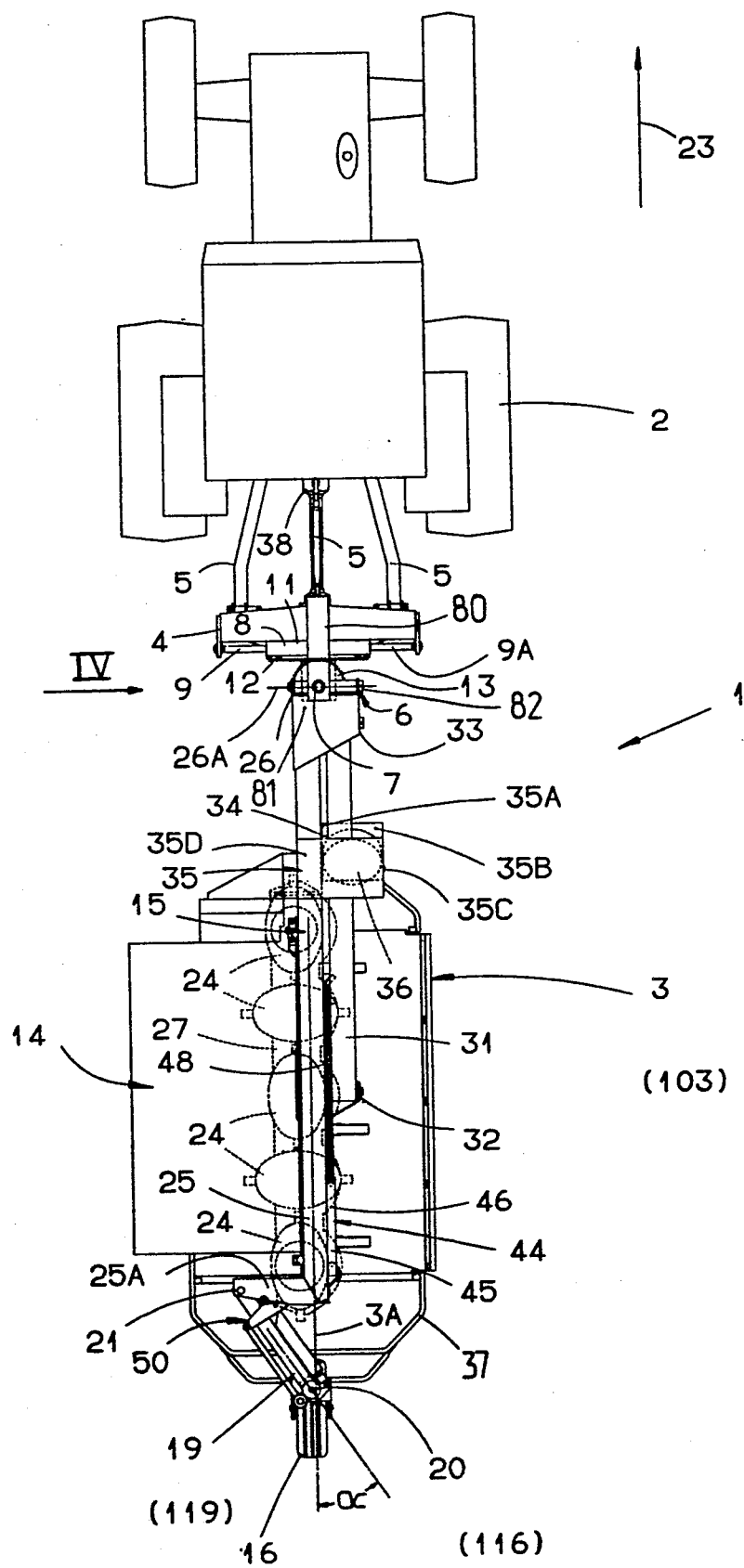
FIG. 5 represents a top view of the harvesting machine placed in the transport position.

Placement into the desired angular position and maintaining a work position (203) (FIGS. 1 and 2) are achieved by a maneuvering actuator (8) with a double rod (9, 9A). Each rod (9, 9A) of this actuator (8) is connected rigidly at its respective end, extending beyond cylinder (11), to hitching structure (4), to make it possible for cylinder (11) of the actuator (8) to be translated horizontally under the action of the oil that feeds it. A rack (12), which engages with a cylindrical gear (13), which is connected in rotation with lower vertical branch (82B) of cross (82), is connected rigidly to cylinder (11). As a result, the axis of rotation of gear (13) is merged with the vertical axis (7A) of the connecting device (6) and gear (13) is connected in rotation with body (3) by cross (82) and second yoke (81). Thus, body (3) can extend, by pivoting around vertical axis (7A)

performed under the action of maneuvering actuator (8), either in a work position (203) beside tractor (2) (FIGS. 1 and 2), or in a transport position (103) in the extension of tractor (2) (FIG. 5).

Further, body (3) of mower (1) comprises a harvesting mechanism (14) suspended from a frame (15). At its end distant from connecting device (6), frame (15) rests on the ground by a wheel (16) which rolls between the flanges of a yoke (17).

A journal (18), whose longitudinal axis extends upward, is connected rigidly on the top of yoke (17). A positioning arm (19) in the shape of a hollow bracket, comprises, in its vertical part, journal (18). The connection of journal (18) with positioning arm (19) is achieved by a pivot-type joint (20) whose geometric axis (20A) is at least approximately vertical. At its longitudinal end opposite to journal (18), positioning arm (19) is connected to frame (15) by a joint (21). The latter is also of pivot type and its geometric axis extends at least approximately parallel to geometric axis (20A) of preceding pivot connection (20). As a result, the angular position of positioning arm (19), equipped with wheel (16), can be modified by making the arm (19) pivot relative to frame (15) around the geometric axis of joint (21). Thus, positioning arm (19) makes it possible for wheel (16) to rotate partially around the end of harvesting mechanism (14) distant from tractor (2) to place the wheel (16) either in transport position (116) (FIG. 5) or in work position (216) (FIG. 1), in which it extends behind the center of gravity of body (3) taking into account the corresponding direction of advance (23 or 23A). In its transport position (119), positioning arm (19) aligns at least approximately wheel (16) with the center of gravity of body (3) and vertical axis (7A) of connecting device (6), and, in its work position (219), positioning arm (19) places wheel (16) behind cutting elements (24) of mower (1). Placement into the desired position and keeping in the latter are achieved by a hydraulic positioning actuator (22) which extends between frame (15) and positioning arm (19).

In FIGS. 1, 2 and 5, the shape of frame (15) is clearly shown. The frame (15) comprises a beam (25) which extends, at work, crosswise to direction of advance (23A) at work and a bracket (25A) which extends parallel to the direction of advance (23A) at work. At the longitudinal end of frame (15), directed toward connecting device (6), beam (25) is connected to cross (82) by second yoke (81). At the other longitudinal end of frame (15), bracket (25A) is connected rigidly to beam (25) and extends backward relative to direction of advance (23A) at work. In addition, bracket (25A) of frame (15) comprises, at its free end opposite to beam (25), joint (21) connecting positioning arm (19) to frame (15). In top view, such an arrangement makes it possible for positioning arm (19), when it is in its transport position (119), to form an acute angle ($\alpha$) with longitudinal axis (3A) of body (3), while in its work position (219), positioning arm (19) forms an at least approximately right angle ($\beta$) with the longitudinal axis (3A).

As shown in FIGS. 1 and 5, the length of body (3) of machine (1) is clearly greater than its width. Since, moreover, body (3) extends, during work, beside tractor (2), it is impossible to transport machine (1) when it is in work position. It is therefore necessary to transpose machine (1), so that the longest dimension of its body (3) extends parallel to direction of transport (23).

To place machine (1) in a work position, it is sufficient that maneuvering actuator (8) and positioning actuator (22) place, then respectively keep body (3) and positioning arm (19) in their corresponding work position (203 or 219). Wheel (16), as described above, is connected to positioning arm (19) by a pivot connection (20) with vertical axis (20A), around which wheel (16) can pivot, to follow automatically direction of advance (23A) during work.

On the other hand, when machine (1) is in transport position (103), positioning actuator (22) keeps positioning arm (19) in its transport position (119), while a locking device (50), with which positioning arm (19) is equipped, locks wheel (16) in its transport position (116) in which wheel (16) is oriented parallel to longitudinal axis (3A) of body (3). Further, the action of maneuvering cylinder (8) is cancelled to make it possible for body (3), when tractor (2) advances, to pivot around vertical axis (7A) of connecting device (6) to follow the path of tractor (2).

Harvesting mechanism (14) is known to one skilled in the art and extends under frame (15) in a direction crosswise to direction of advance (23A) at work. It essentially comprises a cutting bar (27) equipped with cutting elements (24), a carrying structure (28) (FIG. 2) to which processing elements (29) are hooked, and an intake housing (30). Intake housing (30) is connected to the longitudinal end of carrying structure (28) directed toward hitching structure (4) and is intended to drive cutting elements (24) and processing elements (29). Above cutting elements (24), carrying structure (28), supporting processing elements (29), extends at least approximately parallel to cutting bar (27). The processing elements are placed behind cutting elements (24) for processing the product cut by the latter. Moreover, carrying structure (28) comprises protective elements (37) (FIGS. 1 and 5) which extend around cutting bar (27) and which are intended to protect the user or individuals who are in the vicinity.

A suspension arm (31) suspends harvesting mechanism (14) in frame (15). In this embodiment, suspension arm (31) is placed above harvesting mechanism (14) and extends, in top view, at least approximately parallel to beam (25) of frame (15) and in the vicinity of the latter. At one of its longitudinal ends, suspension arm (31) is connected to carrying structure (28) of harvesting mechanism (14), in the median part of the latter, by a pivot-type joint (32). The geometric axis of this joint (32) extends at least approximately in a vertical plane directed in direction of advance (23A) at work and containing the center of the weights of harvesting mechanism (14). Moreover, the geometric axis is at least approximately directed in direction of advance (23A) at work. At its other longitudinal end, suspension arm (31) is connected to beam (25) of frame (15) by a joint (33) placed close to joint (7) with vertical axis (7A) connecting frame (15) to hitching structure (4). This joint (33) is of pivot type and its geometric axis is also directed at least approximately in direction of advance (23A) at work. As a result, suspension arm (31) allows only a movement in height of harvesting mechanism (14), as well as a pivoting of the harvesting mechanism (14) relative to frame (15) around a direction at least approximately parallel to direction of advance (23A) at work. Due to this suspension arm (31), harvesting mechanism (14) can adapt to the configuration of the land and pass over the obstacles that the latter can present.

In FIGS. 1 and 2, it is also shown that suspension arm (31) is equipped with a roller (34). The latter is placed between two joints (32, 33) of the suspension arm (31)

and its axis of rotation intersects at least approximately the geometric axis of joint (33) connecting suspension arm (31) to frame (15). Roller (34) extends more precisely between suspension arm (31) and beam (25) of frame (15), to rest, by a support (35), against the beam (25). Due to this roller (34), the force which opposes the sliding of harvesting mechanism (14) on the ground is transmitted, at least partly, by roller (34) to frame (15). As a result, suspension arm (31) can follow the movements in height of harvesting mechanism (14), joint (33) being relieved in any position of the arm (31).

In this embodiment, support (35) is placed in the vicinity of the median part of the suspension arm (31) and comprises four plane parts (35A, 35B, 35C, 35D), the first (35A) of which is connected to the front side face of beam (25) of frame (15) and against which roller (34) comes to rest. Second part (35B) of this support (35) extends approximately parallel under suspension arm (31). Third part (35C) extends upward in front of suspension arm (31) relative to direction of advance (23A) at work, to form a "U" with preceding parts (35A, 35B). Fourth part (35D) extends horizontally and is connected to the upper face of beam (25) of frame (15). As a result, during movements in height of harvesting mechanism (14), suspension arm (31) moves inside support (35), while roller (34) rests against first part (35A) of the support (35).

A pneumatic spring (36), whose structure comes out in FIGS. 1, 2 and 5, is placed between suspension arm (31) and second part (35B) of support (35), which extends under suspension arm (31). In this way, pneumatic spring (36) supports, by suspension arm (31), a part of the weight of harvesting mechanism (14).

As can be seen in FIGS. 1, 2 and 5, mower (1) also comprises a lifting device (44) of harvesting mechanism (14). This lifting device (44) comprises a lifting actuator (45) whose cylinder (46) is connected to frame (15) and whose rod (47) is connected to a chain (48). This chain (48) winds partially on a wheel (49) (FIG. 2), guided in rotation in frame (15), and is connected at its end distant from lifting actuator (45) to suspension arm (31). At work, when rod (47) has extended, chain (48) is slackened and can be deformed freely, so that lifting device (44) does not interfere with the movement in height of harvesting mechanism (14) relative to frame (15). When harvesting mechanism (14) is to be lifted, it will be sufficient to make rod (47) return into cylinder (46) of lifting actuator (45) by injecting oil in the latter. By so doing, rod (47) pulls, via chain (48), on suspension arm (31), which has the effect of pivoting the arm (31) relative to frame (15) and of making harvesting mechanism (14) rise.

Figure 4:
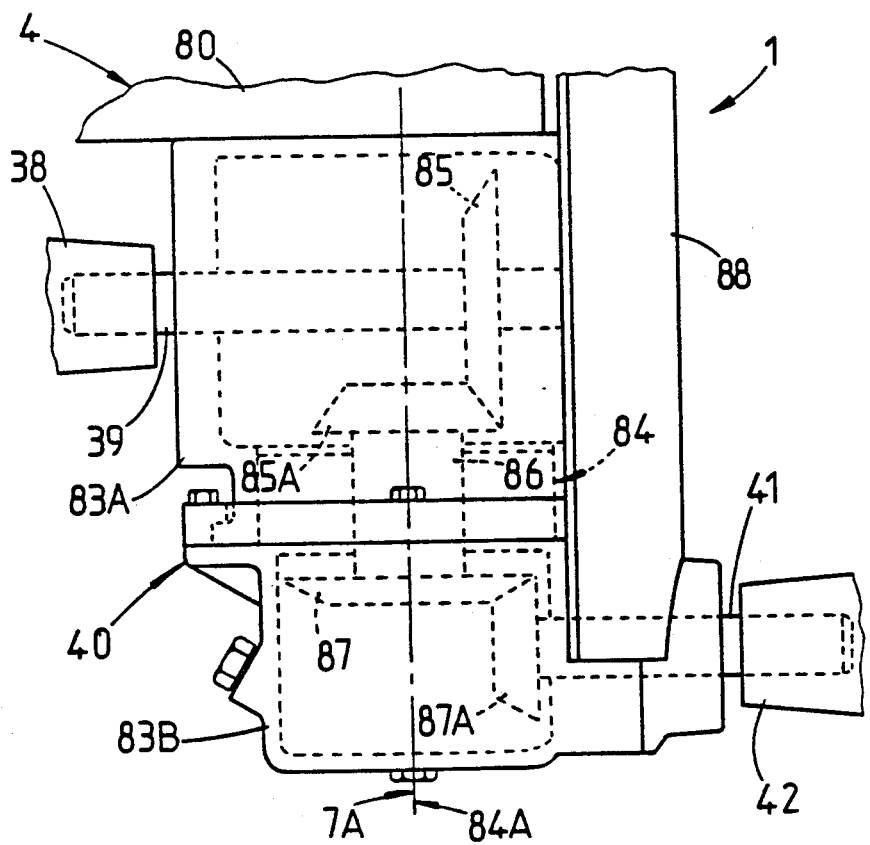
FIG. 4 represents, on an enlarged scale, a view of the movement transmission device along arrow IV defined in FIG. 5.

Harvesting mechanism (14) is driven with a movement transmission device (40) which is shown in FIG. 4. The latter extends under first yoke (80) of hitching structure (4) and comprises an upper housing (83A) and a lower housing (83B). Upper housing (83A) is connected rigidly to hitching structure (4) and contains an input shaft (39) whose axis of rotation extends at least approximately parallel to the axis of rotation of the power takeoff (not shown) of tractor (2). Lower housing (83B) contains an output shaft (41) and is connected to upper housing (83A) by a pivot connection (84) with geometric axis (84A) merged with vertical axis (7A) of connecting device (6). As a result, lower housing (83B) can be pivoted relative to upper housing (83A) around vertical axis (7A) of connecting device (6), so that the axis of rotation of output shaft (41) of lower housing (83B) still extends at least approximately parallel to the axis of rotation of input shaft (43) of intake housing (30) of harvesting mechanism (14). To do this, an orientation element (88) connects in rotating gear (13) with lower housing (83B) (FIG. 2). Thus, gear (13) can simultaneously place under the action of maneuvering actuator (8) body (3) and, by orientation element (88), lower housing (83B) in the desired angular position by pivoting around vertical axis (7A) of connecting device (6).

The driving of harvesting mechanism (14) is performed from the power takeoff of tractor (2), which drives, by a universal joint telescopic shaft (38), input shaft (39) of upper housing (83A) of movement transmission device (40) (FIG. 4). Input shaft (39) drives, by a first bevel gear pair (85, 85A), an intermediate shaft (86) whose axis of rotation is merged with vertical axis (7A) of connecting device ( and which drives, by a second bevel gear pair (87, 87A), output shaft (41) of lower housing (83B). The latter drives, by another universal joint telescopic shaft (42), input shaft (43) of intake housing (30) of harvesting mechanism (14). To reduce the angle of operation of the universal joints of this telescopic shaft (42), output shaft (41) of lower housing (83B) extends, during normal work, at least approximately at the same level as input shaft (43) of intake housing (30) of harvesting mechanism (14).

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A farm machine comprising:
   a connecting means for connection to a three-point hitch of a motor vehicle;
   a body connected to said connecting means through a first joint, said first joint having an upwardly directed axis, said body comprising at least one work element which is driven by a transmission means comprising gear means;
   a maneuvering means and a gear device for pivoting said body around said axis of said first joint;
   a first housing rigidly connected to said connecting means, said first housing comprising an input shaft; and
   a second housing rotatably connected to said body, said second housing comprising an output shaft which extends in a direction of said body;
   wherein, in a vicinity of said first joint, said body is connected to said connecting means through a second joint, said second joint having an axis which is at least approximately perpendicular to the axis of the first joint and to a longitudinal axis of said body, and a universal joint telescopic shaft transmits a rotational movement of said output shaft of said second housing to an input shaft of an intake housing connected to said body.

2. The farm machine according to claim 1, wherein said first joint and said second joint are formed by a cross guided in a yoke of said connecting means and in a yoke of said body.

3. The farm machine according to claim 1, wherein said axis of said first joint and said axis of said second joint are concurrent.

4. The farm machine according to claim 1, wherein said axis of said first joint and said axis of said second joint extend in a vicinity of a vertical plane of symmetry directed in a direction of advance of said connecting means.

5. The farm machine according to claim 1, wherein said second joint is provided between said first joint and said body.

6. The farm machine according to claim 1, wherein said maneuvering means comprises a cylinder, and said maneuvering means is a double rod actuating means or the equivalent.

7. The farm machine according to claim 6, wherein said double rod actuating means is connected at its end extending beyond said cylinder to said connecting means, and said cylinder is in driving connection with said body through said gear device.

8. The farm machine according to claim 7, comprising rack means for achieving a driving connection between said cylinder and said body, said rack means being connected to said cylinder and engaging with a toothed circular sector connected directly or indirectly in rotation with said body and centered on said axis of said first joint.

9. The farm machine according to claim 8, wherein said first joint and said second joint are formed by a cross defining first and second branches guided in a yoke of said connecting means and in a yoke of said body, and wherein said toothed circular sector is connected in rotation with one of said first and second branches of said cross which forms a part of said first joint.

10. The farm machine according to claim 1, wherein said maneuvering means is a hydraulic actuator.

11. The farm machine according to claim 1, wherein the output shaft of said second housing extends at least approximately parallel to the input shaft of said intake housing of said body.

12. The farm machine according to claim 11, wherein the output shaft of the second housing extends at least approximately at the same level as the input shaft of the intake housing of the body.

13. The farm machine according to claim 1, wherein said second housing is connected to said first housing through a cylindrical joint having a swivel pin merged with the axis of said first joint.

14. The farm machine according to claim 13, wherein the input shaft of said first housing drives, by a first bevel gear pair, an intermediate shaft whose axis of rotation is merged with the axis of said first joint and which drives, by a second bevel gear pair, the output shaft of said second housing.

15. The farm machine according to claim 1, wherein said second housing is positioned under said first housing.

16. The farm machine according to claim 13, wherein a rotation of said second housing is controlled by an orientation element means connected directly or indirectly to said body.

17. The farm machine according to claim 16, wherein a driving connection between a cylinder of a maneuvering actuating means, which performs a pivoting of the body around the axis of said first joint and the body through said gear device is achieved by a rack means connected to said cylinder which engages with a toothed circular sector connected directly or indirectly in rotation with said body and centered on the axis of said first joint and wherein said orientation element means connects in rotation said toothed circular sector and said second housing.

18. The farm machine according to claim 1, wherein the body comprises a frame which rests on the ground by at least one wheel, and wherein said at least one work element is connected to said frame to be able to move in height relative to said frame.

19. The farm machine according to claim 1, wherein said at least one work element comprises cutting elements.

20. The farm machine according to claim 1, wherein said at least one work element comprises means for processing the cut product.

* * * * *